United States Patent
Belvin

(10) Patent No.: US 9,165,320 B1
(45) Date of Patent: Oct. 20, 2015

(54) AUTOMATIC ITEM SELECTION AND ORDERING BASED ON RECIPE

(75) Inventor: Brandon W. Belvin, Kirkland, WA (US)

(73) Assignee: Amazon Technologies, Inc., Reno, NV (US)

(*) Notice: Subject to any disclaimer, the term of this patent is extended or adjusted under 35 U.S.C. 154(b) by 622 days.

(21) Appl. No.: 13/158,318

(22) Filed: Jun. 10, 2011

(51) Int. Cl.
*G06Q 30/00* (2012.01)
*G06Q 30/06* (2012.01)

(52) U.S. Cl.
CPC ........ *G06Q 30/0633* (2013.01); *G06Q 30/0631* (2013.01)

(58) Field of Classification Search
CPC .................. G06Q 30/0633; G06Q 30/0631
USPC ................ 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2
See application file for complete search history.

(56) References Cited

U.S. PATENT DOCUMENTS

| | | | | |
|---|---|---|---|---|
| 5,960,411 A | * | 9/1999 | Hartman et al. | 705/26.81 |
| 6,118,820 A | * | 9/2000 | Reitmeier et al. | 375/240.16 |
| 6,370,513 B1 | * | 4/2002 | Kolawa et al. | 705/7.33 |
| 6,434,530 B1 | | 8/2002 | Sloane et al. | |
| 6,922,815 B2 | * | 7/2005 | Rosen | 715/782 |
| 7,055,103 B2 | * | 5/2006 | Lif | 715/764 |
| 7,082,407 B1 | * | 7/2006 | Bezos et al. | 705/26.7 |
| 7,103,566 B2 | * | 9/2006 | Silva et al. | 705/26.8 |
| 7,523,302 B1 | | 4/2009 | Brown et al. | |
| 7,797,204 B2 | * | 9/2010 | Balent | 705/28 |
| 7,825,343 B2 | | 11/2010 | Doerwald | |
| 8,117,199 B2 | * | 2/2012 | Ghani et al. | 707/734 |
| 8,146,799 B2 | | 4/2012 | Kempf et al. | |
| 8,296,194 B2 | | 10/2012 | Chen et al. | |
| 8,412,579 B2 | | 4/2013 | Gonzalez | |
| 8,412,590 B2 | | 4/2013 | Elliott | |
| 8,706,572 B1 | * | 4/2014 | Varadarajan | 705/27.2 |
| 2002/0010637 A1 | | 1/2002 | Lieu et al. | |
| 2002/0026363 A1 | | 2/2002 | Dunaway, Jr. | |
| 2002/0029149 A1 | | 3/2002 | Nishina | |
| 2002/0095345 A1 | * | 7/2002 | Panelli et al. | 705/26 |
| 2003/0004831 A1 | | 1/2003 | Owens | |
| 2003/0018536 A1 | * | 1/2003 | Eggebraaten et al. | 705/26 |
| 2003/0110088 A1 | * | 6/2003 | Starmer et al. | 705/26 |
| 2003/0130908 A1 | | 7/2003 | Hing | |
| 2003/0171944 A1 | | 9/2003 | Fine et al. | |
| 2004/0056101 A1 | | 3/2004 | Barkan et al. | |

(Continued)

OTHER PUBLICATIONS

Rosen, Cheryl "Here's My Order-And Don't Forget the Milk—Bar-Code Scanning Technology Eases Grocery Shopping, Speeds Comedy-Club Reservations.", InformationWeek, Nov. 13, 2000. Retrieved from Dialog File: 275, Acc#: 02449434.*

(Continued)

*Primary Examiner* — Naeem Haq
(74) *Attorney, Agent, or Firm* — Kilpatrick Townsend & Stockton LLP

(57) ABSTRACT

Systems and methods enable the selection of one or more recipes by a user. Items available for purchase from an electronic marketplace can be selected based on the recipe selection. In some instances, the selected items can be automatically placed or added to a virtual shopping cart such that a user can quickly and conveniently purchase the items. In other instances, a purchase transaction for the selected items can be automatically initiated following the selection of the items.

19 Claims, 5 Drawing Sheets

(56) References Cited

U.S. PATENT DOCUMENTS

| | | |
|---|---|---|
| 2005/0038719 A1 | 2/2005 | Young et al. |
| 2006/0064347 A1 | 3/2006 | Robinson et al. |
| 2006/0178947 A1 | 8/2006 | Zsigmond et al. |
| 2006/0224401 A1 | 10/2006 | Hunt |
| 2007/0084919 A1 | 4/2007 | Petrovich |
| 2008/0086318 A1 | 4/2008 | Gilley et al. |
| 2008/0199835 A1 | 8/2008 | Yeager |
| 2008/0300993 A1 | 12/2008 | Rozenblatt |
| 2009/0037288 A1 | 2/2009 | Christensen |
| 2009/0144081 A1 | 6/2009 | Harlan |
| 2009/0234712 A1 | 9/2009 | Kolawa et al. |
| 2010/0292998 A1 | 11/2010 | Bodlaender et al. |
| 2011/0055044 A1 | 3/2011 | Wiedl |
| 2012/0253828 A1 | 10/2012 | Bellacicco |
| 2013/0052616 A1* | 2/2013 | Silverstein et al. ........... 434/127 |

OTHER PUBLICATIONS

U.S. Appl. No. 13/158,323, filed Jun. 10, 2011.
U.S. Appl. No. 14/034,840, filed Sep. 24, 2013.
U.S. Appl. No. 13/347,444, filed Jan. 10, 2012, Titled: "Portioned Ingredient Recipe Completion".

* cited by examiner

AUTOMATIC ITEM SELECTION AND ORDERING BASED ON RECIPE

BACKGROUND

In recent years, purchase transactions conducted over the Internet have grown considerably. Today, millions of people access the Internet to purchase a wide variety of goods and services. For example, many people use the Internet to purchase books, computers, vehicles, clothes, jewelry, furniture, and/or the like. One area of web commerce exhibiting rapid expansion is in the area of food purchase and delivery. Today, many online retailers enable users to conveniently purchase their groceries online.

In an effort to improve user shopping experiences, many online retailers currently provide purchase recommendations to their users. For example, a retailer might recommend that a user purchase a particular desktop computer model that is available from the retailer. While providing recommendations can help users in their purchasing decisions, current recommendation schemes are limited—particularly in the area of food purchase and delivery.

BRIEF DESCRIPTION OF THE DRAWINGS

Various embodiments in accordance with the present disclosure will be described with reference to the drawings, in which.

DETAILED DESCRIPTION

Figure 1:
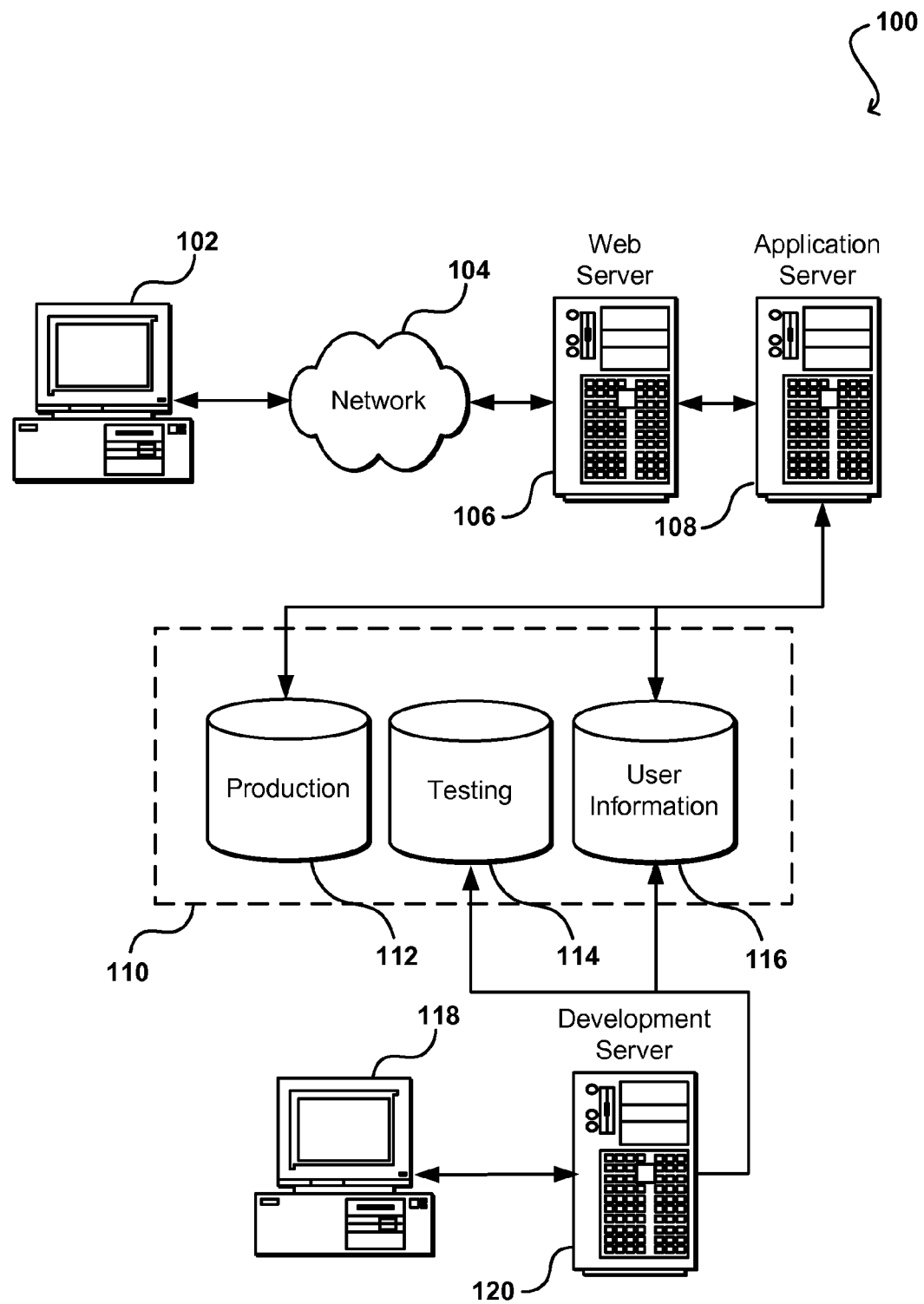
FIG. 1 illustrates an environment in which various embodiments can be implemented.

Systems and methods in accordance with various embodiments of the present disclosure enable the selection of one or more recipes by a user. In some embodiments, items available for purchase from an electronic marketplace can be selected based on the recipe selection. In certain embodiments, the selected items can be automatically placed or added to a virtual shopping cart such that a user can quickly and conveniently purchase the items. In other embodiments, a purchase order for the selected items can be automatically created following the selection of the items. In such embodiments, a specific user confirmation to create the order might not be required. After the items are purchased, the items can be delivered or shipped to the user.

Illustratively, embodiments can enable a user to input one or more recipes. For example, a user can select one or more recipes from a recipe catalog provided by an electronic marketplace. Upon receiving the recipe selections, embodiments can select one or more items available for purchase from the electronic marketplace. Each selected item can be an item that is required to complete the one or more recipes. For example, a recipe may require the use of an apple, as such embodiments can select an apple item available for purchase from the electronic marketplace. As another example, a recipe may require the use of a stand mixer, as a result embodiments can select a particular brand of stand mixer available for purchase from the electronic marketplace. In some instances, after selecting the one or more items, embodiments can present, to the user, information for the one or more items as part of a virtual shopping cart or shopping bag. From the virtual shopping cart, the user can initiate a purchase transaction for the items such that the items are delivered to him or her. In other instances, embodiments can, without substantial user intervention, create a purchase order following the selection of the one or more items. In this way, a user does not need to access a virtual shopping cart to make a purchase. Rather, the user simply needs to make a recipe selection in order to have items for the recipe ordered and/or delivered to him or her.

In some embodiments, the selection of the one or more items from the electronic marketplace can be based on any suitable user preference criteria, such as price ranges, food allergies, religious requirements, favored food genres, preparation skill levels, preparation times, associated diet plans, caloric values, etc. For example, a user might have previously indicated that he or she wishes to stay within a $10.00 budget for preparing a meal. As such, embodiments can select items available from the electronic marketplace that meet the price requirements of the user. Illustratively, a recipe input by a user might require the use of vanilla extract. The user might have previously indicated that the recipe cost less than $25.00 to complete. As such, embodiments might select a generic bottle of vanilla extract over a more expensive branded bottle of vanilla extract in order to keep the cost of the recipe within the $25.00 budget.

Through automatically selecting items for recipes and either placing those items into a virtual shopping cart or initiating a purchase order on behalf of a user, embodiments can improve the speed and convenience of shopping for groceries online. Illustratively, at present, users can spend a large amount of time manually searching for the required ingredients of a recipe. Furthermore, some recipes can be cryptic or hard to understand. As such, users can often find it difficult to select the appropriate items to purchase. Embodiments, by automatically identifying appropriate items for use with a recipe can significantly improve the convenience of shopping for groceries. In embodiments that automatically initiate purchase orders for a user without a specific user purchase confirmation, the speed and convenience of shopping for groceries can be further improved.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, tablet devices, multimedia digital players, cell phones, handheld messaging devices, laptop computers, set-top boxes, personal data assistants, electronic book readers, and/or the like. In some embodiments, client device 102 can store data files (e.g., cookies) that can be transmitted over network 104 to, for example, Web server 106 in order to convey identification and/or other information. Network 104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect (e.g., catalog data for items available for purchase, recipe data including one or more recipes, etc.). For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item (e.g., a food item). In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that described with respect to FIG. 1 can be used to provide items for consumption by potential customers. As used herein, the term "item" can refer to anything, such as a product (e.g., food or kitchen equipment), an electronic embodiment of or reference to a product, a service, or a system, that can be ordered, purchased, rented, used, transferred, or otherwise consumed and/or accessed via a network request or electronic submission as part of an electronic transaction. A request can include any appropriate request sent over an appropriate system or network, such as a request submitted to a Web page over the Internet or a message sent via a messaging system to a content provider, for example.

In an example in accordance with one embodiment, a user of an electronic marketplace is able to send requests from a client device 102 over a network 104 that are received by an application server 108 to allow the user to input recipes, browse for recipes, browse items offered by the electronic marketplace, etc. Using any of a variety of methods known or used in the art, the user is able to input recipes; search for and browse recipes; and search for and browse items offered by the marketplace. The user can be presented with any appropriate information available for each recipe and/or item. For example, the user can be provided with a description and price for a food item. In the embodiment, the user can select items that he or she would like to consume by using a virtual shopping cart or other repository for items. When the user is finished selecting items for a given transaction, the user can be presented with an interface allowing the user to purchase the items. It should be appreciated that various approaches exist within the scope of the various embodiments.

In some embodiments, a server of a content provider, such as a provider of an electronic marketplace can store, on data store 110, catalog data. The catalog data can include information regarding one or more items that are available for purchase from the electronic marketplace. In some embodiments, the catalog data can include information for items available for purchase directly from the provider of the electronic marketplace and/or items available for purchase from third party vendors associated with the electronic marketplace. In some embodiments, the information for items in the catalog data can include, for example, item prices, item features, item images, item specifications, item descriptions, video clips, audio clips, user comments, reviews from both paper and online-based periodicals and/or the like. Illustratively, a package of lettuce available from the electronic marketplace can be associated with a price and user reviews for the product.

In some embodiments, a server of a content provider can additionally store, on data store 110, recipe data. The recipe data can be received from any suitable source, including one or more third party entities. In some embodiments, the recipe data can include one or more recipes. Each recipe can be associated with certain recipe attributes, metadata, tags, and/or the like. For example, each recipe can be associated with a set of attributes indicating the recipe's caloric value, associated diet plans, associated food genres, religious approvals, preparation skill levels, preparation times, serving numbers, meal type (e.g., breakfast, lunch, dinner, anytime, etc.) and/or any other suitable recipe related vector. Illustratively, a recipe can be associated with a first attribute indicating an Italian food genre and a second attribute indicating that the recipe is in accordance with kosher requirements.

Each recipe can further include instructions for cooking a particular dish or meal. The instructions can include text, images, video, audio, hyperlinks, and/or any other suitable multimedia elements. In some embodiments, each recipe can reference one or more food items, kitchen equipment items, and/or the like. Embodiments of the present invention can analyze the instructions (e.g., parse text-based instructions) of each recipe to identify the one or more items referenced by the recipe. For example, a recipe can reference use of a sugar ingredient and a mixing bowl. Embodiments of the present invention can perform a parsing operation on the text of the recipe in order to identify the aforementioned sugar ingredient and mixing bowl item.

Embodiments can further associate one or more of the identified food items, kitchen equipment, and/or the like with one or more items referenced in an electronic marketplace's catalog data. For example, a recipe can include an apple ingredient. Embodiments can associate or map the apple ingredient in the recipe with an apple product referenced in the electronic marketplace's catalog data. As another example, a recipe can include a mushroom ingredient. Embodiments can associate or map the mushroom ingredient with a button mushroom product, an oyster mushroom product, and a chanterelle mushroom product, each of which can be referenced in the electronic marketplace's catalog data.

Embodiments can associate or map items referenced in a recipe with items referenced in an electronic marketplace's catalog data in any suitable manner. For example, embodiments can associate items through identifying those items with identical or similar identifiers. Illustratively, an ingredient referenced in a recipe and an item referenced in the catalog data can both include the term "apple" in their names or descriptions. As such, embodiments can associate the ingredient with the item.

As another example, embodiments can associate or map items belonging to the same class or category. In particular, embodiments can determine that an item referenced in a recipe is associated with a particular item category. Embodiments can further determine items referenced in the catalog data are also associated with the same item category. Embodiments can, based on the determinations, associate or map the item referenced in the recipe to the items referenced in the catalog data. Illustratively, an ingredient of a recipe can be identified as being associated with a cabbage category. A napa product and a savoy product referenced in the catalog data can also be identified as being associated with the cabbage category. As such, embodiments can associate the ingredient in the recipe with the napa and savoy products referenced in the catalog data. In this way, items referenced in a recipe can be associated with items referenced in the catalog data without requiring that the items include identical or similar identifiers. Associations between an item and a category can be determined in any suitable manner. For example, associations can be manually provided or input by a user or group of users. As another example, associations can be determined based on a suitable algorithm. Illustratively, associations can be determined based on a fuzzy logic algorithm.

Embodiments can further associate items referenced in a recipe with items referenced in the catalog data based on user input. For example, embodiments can enable a recipe editor, system administrator, or any other suitable user to associate an item referenced in a recipe with one or more items referenced in the catalog data. Illustratively, embodiments can provide an interface that enables a recipe editor to associate an ingredient in a particular recipe with, for example, a strawberry item, a blueberry item, and a raspberry item referenced in an electronic marketplace's catalog data.

In some embodiments, items from a recipe can be associated with alternative items. For example, a recipe might specify a button mushroom. Embodiments might associate the button mushroom with a button mushroom item referenced in the catalog data of an electronic marketplace. Embodiments might additionally associate the button mushroom with an alternative item in the catalog data, such as a cremini mushroom. In some embodiments, it may be preferable to select an alternative item instead of a standard item. Selection of an alternative item over a standard item can occur for any suitable reason. For example, an alternative might be selected because a user has indicated that he or she does not like the original ingredient specified in a recipe. As another example, an alternative might be selected in order to enable a recipe to meet certain user preferences, such as a caloric value, a price range, etc.

Determination of a specific alternative item for a standard item can be performed using any suitable criteria or information. For example, alternative items can be determined based on associated food item categories, food item taste profiles, information provided by a recipe editor, crowd-sourcing information, and/or the like. Illustratively, users of the electronic marketplace (via a suitable interface) might recommend that a certain cheaper ingredient be used in a recipe over a more expensive counterpart. Based on this crowd-sourced information, embodiments might determine that the cheaper ingredient is a suitable alternative for the more expensive ingredient.

According to some embodiments, recipes and information for items available for purchase from an electronic marketplace can be presented to users in various fashions at various locations and times, such as during item discovery (e.g., searching, browsing, etc.) and/or at various points in an order pipeline.

For example, a user can access a web page associated with the electronic marketplace to browse for one or more recipes. Upon deciding on a particular recipe, the user can select the recipe. Embodiments can thereafter populate the user's virtual shopping cart with the items needed to complete the recipe. Thereafter, the user can access the virtual shopping cart to obtain information regarding the different items needed to complete the recipe, and also to create a purchase order for the items. In some instances, rather than populating a virtual shopping cart, embodiments can automatically create a purchase order on behalf of the user. In doing so, items needed by the user to complete the selected recipe can be automatically delivered to the user.

As another example, a user can access a recipe web page available from the server of a third party content provider, such as the website of a cooking periodical. The web page may include a hyperlink, button, or any other suitable interface element for purchasing the items needed to complete the recipe. In some instances, by clicking on the interface element, a virtual shopping cart for the electronic marketplace can be populated with the items needed to complete the recipe. The user may later access the virtual shopping cart to initiate a purchase transaction for the items. In other instances, rather than populating a virtual shopping cart, embodiments can automatically create a purchase order on behalf of the user. In this example, transfer of the information for the recipe from the third party content provider to the electronic marketplace can occur in any suitable manner. Illustratively, information for the items necessary for the recipe can be transmitted from a server of the third party content provider to a server of the electronic marketplace. Upon receipt, embodiments can select one or more of the items from the electronic marketplace, and either populate a virtual shopping cart or automatically create a purchase order on behalf of the user.

In some embodiments, an algorithm can be employed to select one or more items from the electronic marketplace. The one or more items can be those items needed to complete the recipes selected by the user. The algorithm can consider any suitable criteria or combinations of criteria to select the one or more items. In some embodiments, the algorithm can consider a set of user preferences in order to select the one or more items. User preference criteria can include any suitable criteria, such as food allergy criteria, serving number criteria, a calorie requirement, a diet plan, an exercise plan, a religious requirement, a meal preparation skill level, a set of preferred food items, price criteria, a set of food item exclusions, etc. For example, items referenced in a recipe can be associated with more than one item available for purchase from an electronic marketplace. Illustratively, a vanilla extract ingredient in a recipe might be associated with 10 different brands of vanilla extract available from the electronic marketplace. As part of his or her user preferences, a user might have indicated that he or she wishes to have the cheapest option for completing a selected recipe. In order to reduce the cost of the recipe, the algorithm might select the brand of vanilla extract with the lowest price.

In some embodiments, the algorithm can swap items in a recipe to allow the recipe to meet the criteria provided by a user's preferences. For example, a particular recipe might require a relatively expensive portabella mushroom that would cause the recipe to cost more than $10.00 to complete. The algorithm might, in order to reduce the cost of the recipe, swap out the portabella mushroom with a more cost effective button mushroom alternative. As another example, a particular recipe might require a particular ingredient that does not meet the religious requirements specified by a user. The algorithm might swap out the ingredient for an ingredient that meets the religious requirements of the user. As still another example, a particular recipe might require an ingredient to which a user has indicated he or she is allergic. The algorithm might swap out the ingredient for an ingredient to which a user has indicated he or she is not allergic.

In some embodiments, the algorithm can select items based on historical user data. In some instances, the historical user data can include data specific to the user. In certain implementations, the algorithm can analyze the purchase history of the user to determine items that the user might prefer to be used in the selected recipes. As a simple example, a user might have previously purchased frozen pizzas, dried pasta, and parmesan cheese. Each of the aforementioned items might be associated with a single product brand. Based on this information, the algorithm might select or be more inclined to select items associated with the same product brand. In some embodiments, historical user data can additionally or alternatively include aggregate user data collected by the electronic marketplace (e.g., via a server). In some implementations, the algorithm can determine those items that are most popular and/or most highly rated by users of the electronic marketplace. Based on this information, the algorithm might select or be more inclined to select items that are relatively popular or highly rated.

In some embodiments, the algorithm can select items based on training data provided by the user. Embodiments can obtain the training data in any suitable manner. For example, the training data can be based on ratings previously provided for items that the user has previously purchased. The training data can be additionally or alternatively be based on ratings provided by the user for a series of example items. Illustratively, embodiments might present the user with a series of example items. The user can provide ratings for each example item. In some embodiments, the ratings can indicate the user's relative like or dislike for a particular item. The algorithm can use the ratings provided by the training data to determine those items that the user might tend to prefer. Embodiments can use any combination of item attributes (e.g., brand name, caloric value, price, etc.) and other information gleaned from the training data to determine those items that the user might tend to enjoy or prefer. For example, the algorithm might determine that the user tends to prefer brand name items over generic items. As a result, the algorithm might be more included to select brand name items for the user. As another example, the algorithm might determine that the user tends to prefer low cost food items. As a result, the algorithm might be more inclined to select cheaper food item options for the user.

In some embodiments, where a user has selected more than one recipe, the algorithm can determine whether any duplicate ingredients are shared among the recipes and adjust the quantity of any duplicate ingredients accordingly. Illustratively, a user may have selected three recipes. Each recipe can require, for example, a slice of bread. The algorithm can determine that a single loaf of bread would be sufficient to complete each of the three recipes. As such, only one loaf of bread would be selected (rather than, for example three loaves—one for each recipe). In this way, a user can obtain a sufficient amount of ingredients necessary to complete his or her selected recipes while avoiding over purchasing the quantity of the ingredients.

In some embodiments, as discussed, information for one or more items available for purchase from the electronic marketplace can be presented to a user via a virtual shopping cart upon the user's selection of a recipe that requires the items. The user can thereafter initiate a purchase transaction by providing an order confirmation. In other embodiments, the one or more items might not be presented to a user prior to initiation of the purchase transaction. Rather, a purchase transaction can be automatically initiated for the one or more items. In such embodiments, the user can have previously provided payment and shipment information, which can be securely stored in, for example, data store 110. As such, the purchase transaction and shipment of the items to the user can proceed without substantial user intervention.

In some embodiments, a user can indicate that the delivery of certain items is to be spread out or suitably distributed over a time period. Illustratively, a user might select two recipes and a number of items associated with the recipes for purchase. The user might further indicate that he or she would like to make the first recipe on Monday, and the second recipe on Tuesday. As such, only items associated with the first recipe would be delivered on Monday. Items associated with the second recipe would thereafter be delivered on Tuesday.

Figure 2:
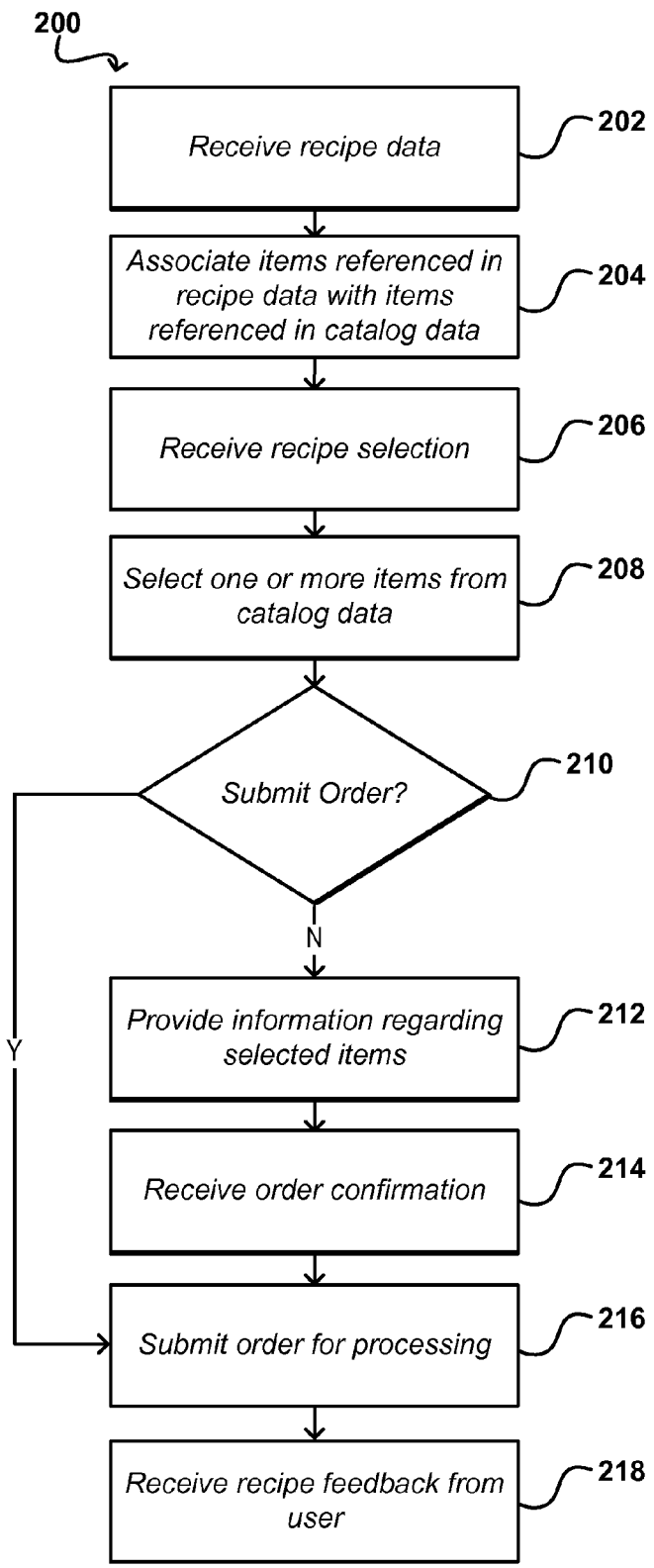
FIG. 2 illustrates a process for selecting items for purchase based on one or more selected recipes in accordance with one embodiment.

FIG. 2 illustrates a process for selecting items for purchase based on a selected recipe in accordance with one embodiment. In this example 200, recipe data can be received at block 202. The recipe data can be received from, for example, one or more third party entities. As discussed, the recipe data can include one or more recipes. In some embodiments, each recipe can include instructions specifying, for example, the use of certain items, such as ingredients, kitchen equipment, etc. At block 204, the items specified in each recipe can be associated with items referenced in the catalog data of an electronic marketplace. The items referenced in the catalog data can be those items that are available for purchase from the electronic marketplace. At block 206, a recipe selection can be received from a user. The recipe selection can include information regarding one or more recipes that the user would like to prepare. In some embodiments, the recipe selection can additionally include user preferences. The user preferences can include any suitable recipe vectors, including price ranges, caloric values, religious requirements, preparation skill levels, food items to avoid, and/or the like. At block 208, one or more items can be selected. The items can be those items that are needed complete the selected one or more recipes. Illustratively, a user can select a recipe for a salad. As such, the items (e.g., food items, kitchen equipment) needed to complete the salad can be selected from the catalog data. In some embodiments, the selection of the items can be influenced by the user preferences and purchase history provided by the user. At decision 210, a determination can be performed as to whether an order for the one or more items should be automatically created. The determination can be performed based on any suitable criteria or information. For example, the user might have indicated previously that an order for any selected items should be automatically created. If it is determined that an order should be created, the process can proceed to block 216. Otherwise, the process can proceed to block 212. At block 212, information regarding the selected items can be provided to the user. In particular, the selected items can be placed in a virtual shopping cart, which can enable a user to view various information regarding the selected items. The information can include price information, quantity information, item descriptions, specifications, ratings, etc. In some embodiments, the user can change, update, or add additional items to the virtual shopping cart. Once the user is satisfied with the different items in his or her virtual shopping cart, a confirmation can be received from the user for the order at block 214. The confirmation can be a result of the user selecting an order submit selection or similar option, for example. At block 216, the order can be submitted for processing such that the items can be delivered to the user. At a later time, feedback for a selected recipe (e.g., rating information) can be provided by the user at block 218.

While FIG. 2 shows a specific set of steps, there can be several additional and/or alternative steps that can be used with the steps shown in FIG. 2 or fewer steps in any appropriate order, in accordance with various embodiments.

Figure 3:
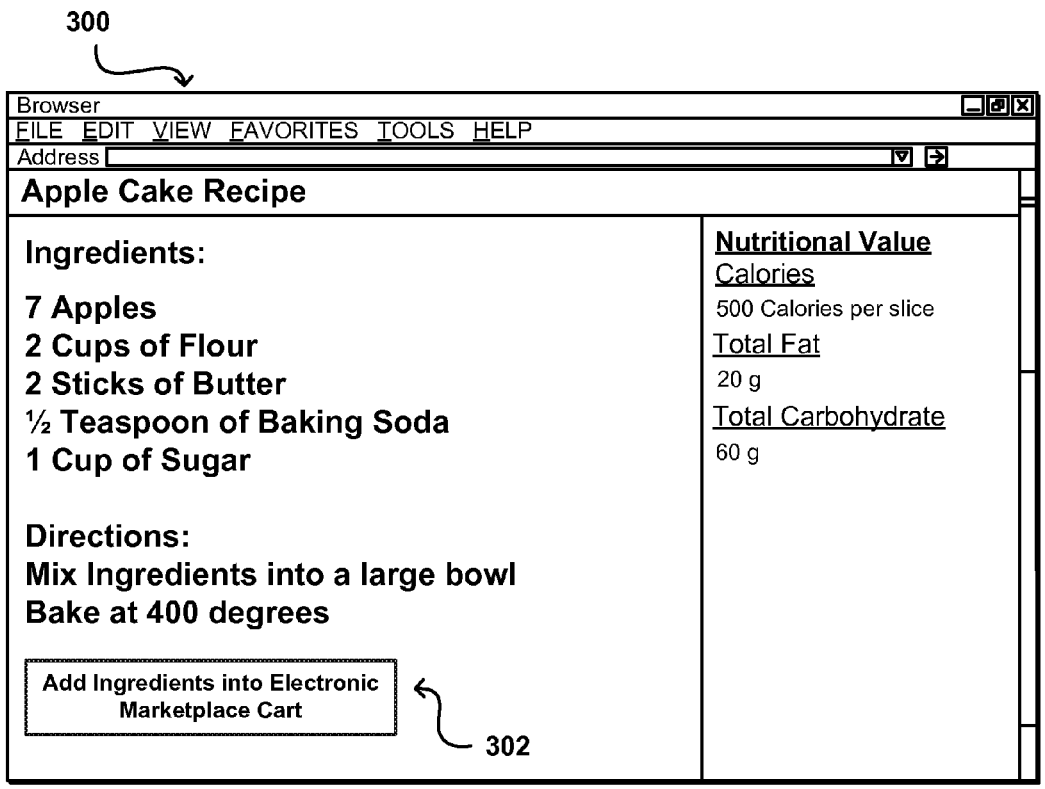
FIG. 3 illustrates an example of an interface that can be generated for display to allow a user to select a recipe in accordance with one embodiment.

FIG. 3 illustrates an example of an interface 300 that can be generated for display to allow a user to select a recipe in accordance with one embodiment. In this example, a user can view a web page that includes information for a recipe. The web page can include recipe instructions, list of ingredients, nutritional values, and other information. Illustratively, FIG. 3 shows an apple cake recipe that includes the ingredients (e.g., apples, flour, etc.) required to complete the apple cake. The example additionally includes directions for making the apple cake and nutritional information.

In some embodiments, interface 300 can include an interface element 302. Interface element 302 can be any suitable interface element, such as a button, hyperlink, drop down box, etc. According to some embodiments, upon selecting interface element 302, embodiments can automatically generate a virtual shopping cart for the user. The virtual shopping cart can include the items referenced by the cake recipe. Illustratively, upon selecting interface element 302, a virtual shopping cart for the user can be automatically populated with 7 apple items, a package of flour, 2 sticks of butter, a package of baking soda, and a package of sugar. The items in the virtual shopping cart can be those items available for purchase from an electronic marketplace. In some embodiments, upon selecting interface element 302, embodiments can automatically create a purchase order for items referenced by the cake recipe. For example, an order including 7 apple items, a package of flour, 2 sticks of butter, a package of baking soda, and a package of sugar can be processed and delivered to the user.

Interface 300 can be presented in any suitable location. For example, in some embodiments, interface 300 can be accessed from a server of the electronic marketplace. As another example, interface 300 can be accessed from the server of a third party entity. Illustratively, a user can access interface 300 via a server associated with the website of a cooking magazine. Upon selecting button 302, information for the selected recipe, including the items referenced by the recipe, can be transmitted to a server of the electronic marketplace.

Figure 4:
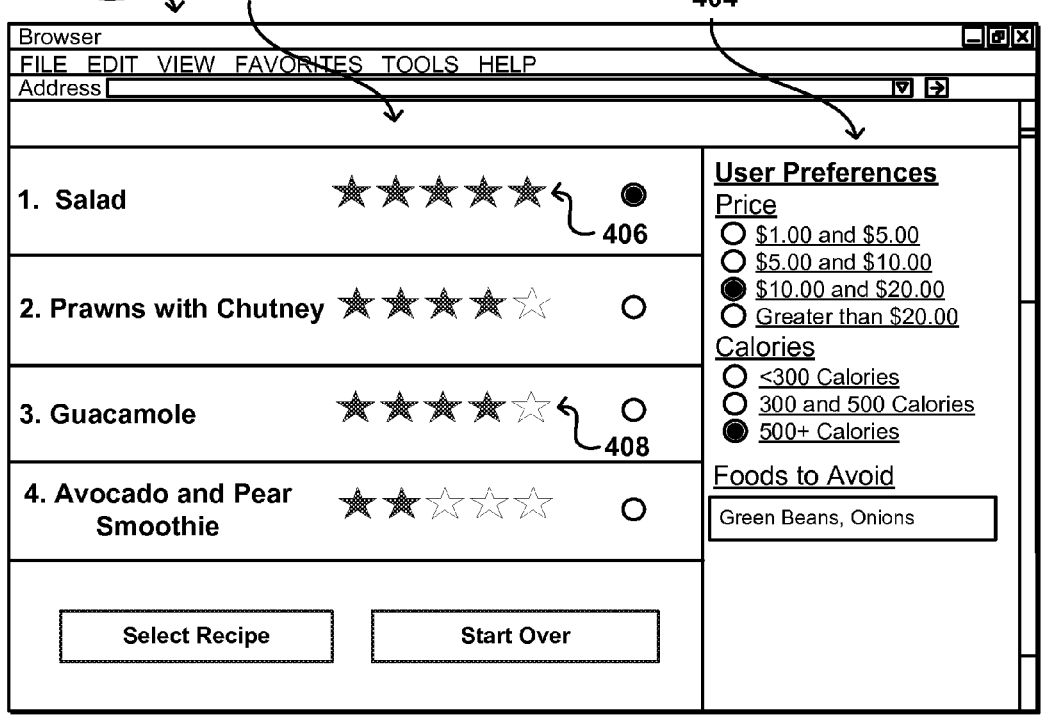
FIG. 4 illustrates an example of an interface that can be generated for display to allow a user to select a recipe in accordance with another embodiment.

FIG. 4 illustrates an example of an interface 400 that can be generated for display to allow a user to select a recipe in accordance with another embodiment. Illustratively, interface 400 shows a list 402 including a salad recipe; a prawns with chutney recipe; a guacamole recipe; and an avocado and pear smoothie recipe. As shown in FIG. 4, a set of user preferences 404 is displayed that enables a user to specify criteria that can influence the recipes presented in list 402. In this example, a user can be presented with pricing ranges, calorie ranges, a field related to foods exclusions, and a field for inputting favored food genres. As shown in FIG. 4, the user has, for example, specified that any listed recipes cost greater than $20.00.

As discussed, the recipes in list 402 can meet certain user preferences input by the user. For example, the user may have indicated that green beans and onions be avoided in any selected recipes. As a result, each recipe in the list might not include green beans or onions as ingredients. In some embodiments, not all the user preferences are required to be met in order for a recipe to be presented. In certain embodiments, list 402 can be updated dynamically. More specifically, as a user changes or updates his or her user preferences, list 402 can be automatically updated (e.g., new recipes presented, recipes removed, recipes re-ordered, etc.) in real-time or substantially real-time to reflect changes in the user preferences.

In some embodiments, list 402 can be ranked or ordered. According to some embodiments, recipes ranked higher can appear at the top of list 402 while lower ranked recipes can appear at the bottom of the list. The rankings of the recipes can be based on any suitable criteria or combinations of criteria. In certain embodiments, recipes can be ranked based on how closely the recipes meet a user's preferences. For example, recipes that meet a greater number of the user's preferences can be ranked higher. In some embodiments, recipes can be ranked based on user historical data and/or user provided ratings. In the example of FIG. 4, the recipes in list 402 are ranked based on the star rating for each recipe. A recipe's individual star rating can be the average rating for the recipe provided by an electronic marketplace's users. In this example, users can provide a recipe with a rating between one and five stars. Recipes with more stars can be rated and ranked higher than recipes with fewer stars. Illustratively, the salad recipe has a 5 star rating 404 and as such is rated higher than the guacamole recipe, which has a 4 star rating 406. As a result, the salad recipe is positioned higher on list 402 than the guacamole recipe.

In some embodiments, interface 400 can be used in addition or in alternative to interface 300 shown in FIG. 3. Illustratively, embodiments can enable a user to select a recipe while viewing detailed information for the recipe (e.g., view a web page regarding a recipe that includes instructions and an ingredients list, etc.). Embodiments can further enable a user to select one or more recipes from a list of recipes. In the view, as shown in interface 400, detailed information, such as an ingredients list, might not be presented to the user.

Figure 5:
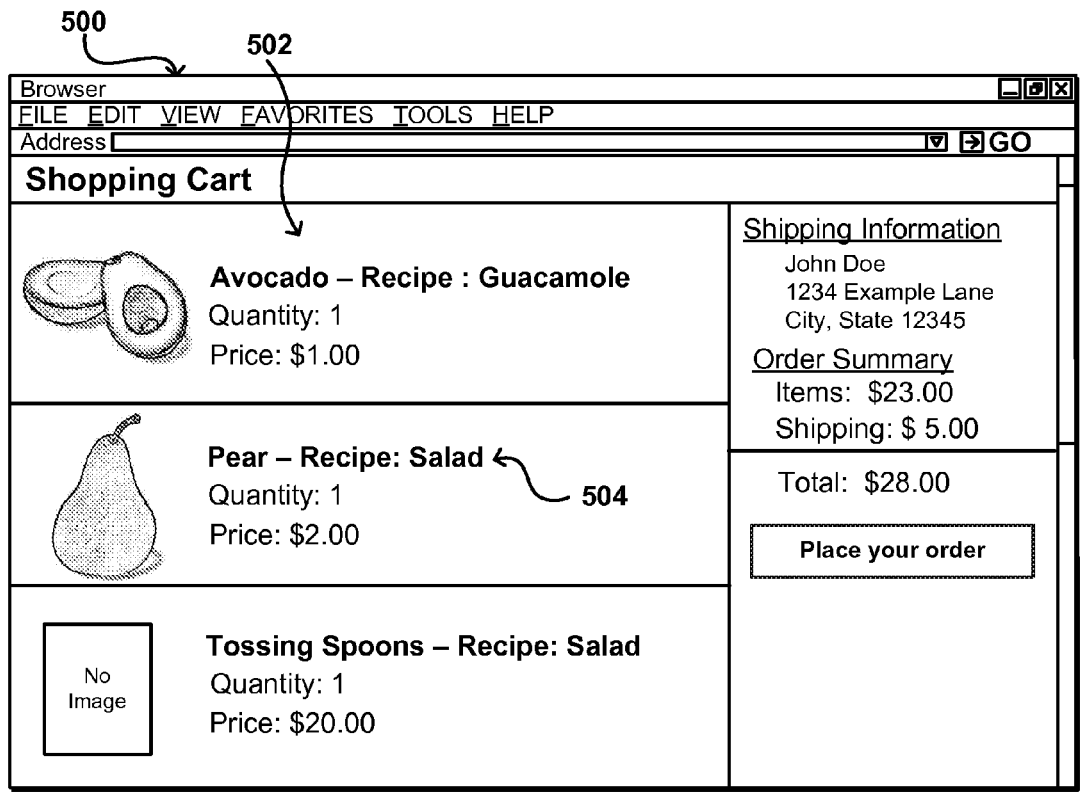
FIG. 5 illustrates an example of an interface that can be generated for display to allow a user to view the contents of a virtual shopping cart assembled based on one or more selected recipes in accordance with one embodiment.

FIG. 5 illustrates an example of an interface that can be generated for display to allow a user to view the contents of a virtual shopping cart assembled based on one or more selected recipes in accordance with one embodiment. In the example, the virtual shopping cart includes a list 502 of one or more items selected for purchase. As shown in FIG. 5, the list includes an avocado item, a pear item, and a tossing spoons item. Each of the aforementioned items can have been automatically added to the virtual shopping cart based on recipes previously selected by the user. The avocado, pear, and tossing spoons items can represent those items that are available for purchase from the electronic marketplace. In some embodiments, each item in the list can include various purchase information, such as a price for the item, a selected quantity to be purchased, etc. For example, the pear item is shown as being $2.00 in price. In certain embodiments, each item in the list can include the recipe with which it is associated. For example, the pear item includes a description 504 that indicates that the pear item is associated with (e.g., to be used for) a salad recipe previously selected by the user. In this way, a user can be apprised of the particular recipe with which each item in his or her shopping cart is associated.

Upon reviewing the information displayed by interface 500, a user can cause a purchase transaction to be initiated by clicking on a suitable interface element. For example, interface 500 includes a "Place your order" button. Following the purchase transaction (which may also include the input of payment information, shipping information, etc.) the items listed in the virtual shopping cart can be distributed or delivered to the user. In certain embodiments, any deliveries of items to the user can further include physical copies of each selected recipe with which the items are to be used. In some embodiments, the physical copies can include bar codes or some other recipe identification mechanism. In the event the user wishes to make a recipe again, the user can use a suitable optical device (e.g., a mobile device camera, webcam connected to a computer, a bar code scanner connected to a computer, etc.) to conveniently provide a recipe selection to a server of the electronic marketplace.

Figure 6:
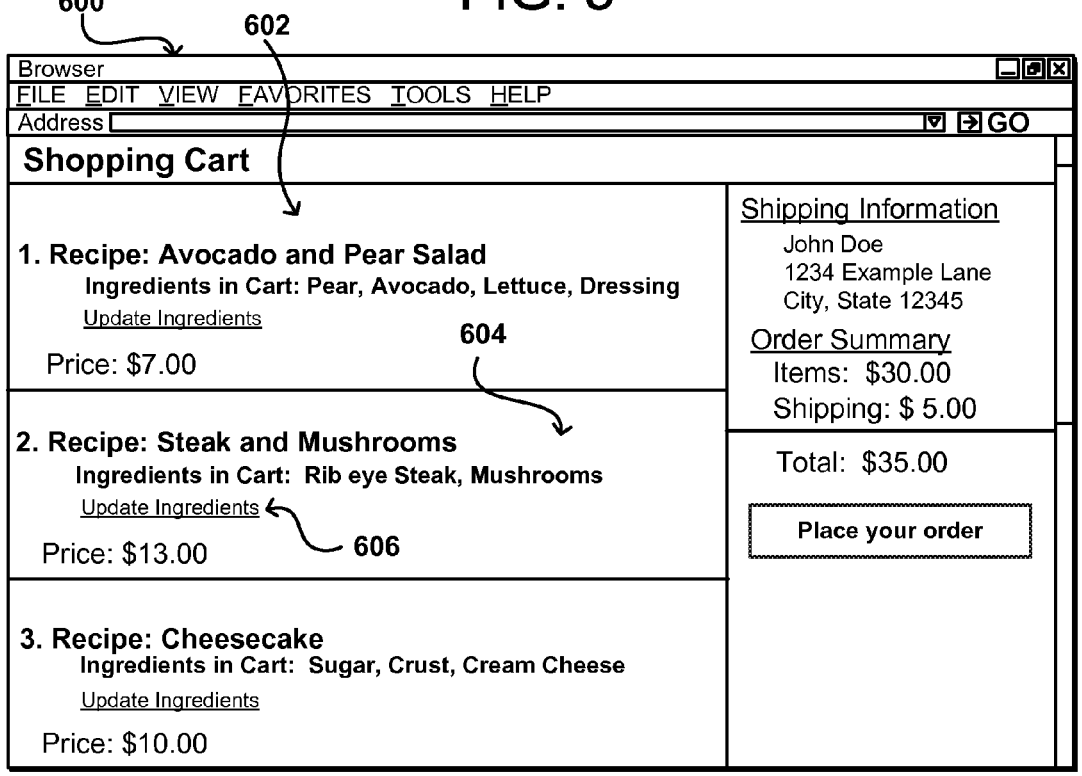
FIG. 6 illustrates an example of an interface that can be generated for display to allow a user to view the contents of a virtual shopping cart assembled based on one or more selected recipes in accordance with another embodiment.

FIG. 6 illustrates an example of an interface 600 that can be generated for display to allow a user to view the contents of a virtual shopping cart assembled based on one or more selected recipes in accordance with another embodiment. Interface 600 can be similar to interface 500 shown in FIG. 5. However, rather than presenting a list based on the items selected for purchase, interface 600 can be based on the one or more recipes previously selected by the user. In particular, interface 600 includes a list 602 including those recipes previously selected by the user. As shown in FIG. 6, list 602 includes an avocado and pear salad recipe, a steak and mushrooms recipe, and a cheesecake recipe. As further shown in FIG. 6, each recipe in the list 602 can include a description listing the items that are currently in the shopping cart. For example, description 604 lists the ingredients needed to complete the steak and mushroom recipe. In addition, description 604 notes that these ingredients are currently in the user's virtual shopping cart. As also shown in FIG. 6, an interface element 606 (e.g., a hyperlink) can be used to update the ingredients in the shopping cart. For example, a user might currently own or have in his or her possession, a rib eye steak. As such, the user might click on interface element 606 to remove the rib eye steak from the cart. As discussed with respect to FIG. 5, a user can click on the "Place your order" button to initiate a purchase transaction. As also discussed, any deliveries of items to the user can include physical copies of each selected recipe with which the items are to be used. In the event the user wishes to make a recipe again, the user can use a suitable optical device (e.g., a mobile device camera, webcam connected to a computer, a bar code scanner connected to a computer, etc.) to conveniently provide a recipe selection to a server of the electronic marketplace.

Figure 7:
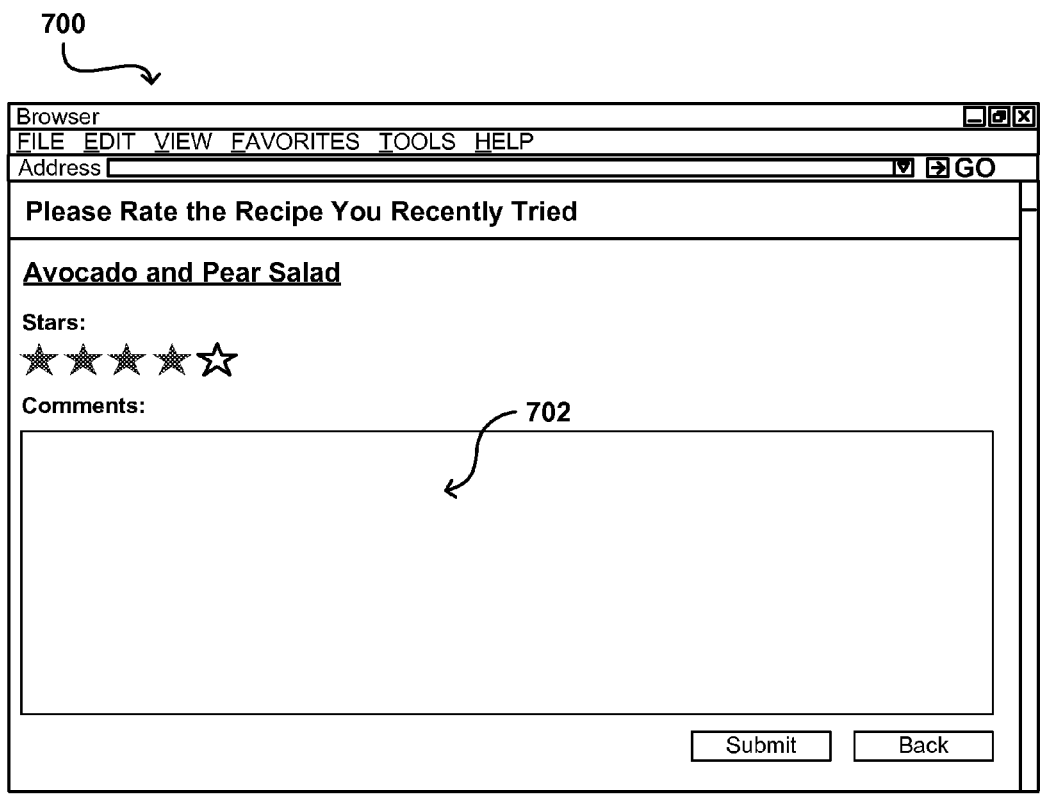
FIG. 7 illustrates an example of an interface that can be generated for display to allow a user to input rating information and comments for a recipe in accordance with one embodiment.

FIG. 7 illustrates an example of an interface 700 that can be generated for display to allow a user to provide feedback for a recipe in accordance with one embodiment. In some embodiments, a rating system can be provided. The rating system can enable a user to indicate his or her relative satisfaction with a recipe that the user has previously tried. In this example, the rating system is based on a star rating system. In particular, a user can provide a star rating between one and five stars. In certain embodiments, a high star rating can indicate that a user is relatively satisfied with the recipe. The provided rating can be used in any suitable manner. For example, embodiments can use the ratings to later determine other recipes that the user might like or dislike. As another example, the rating can be averaged with the ratings provided by other users for the recipe. In some embodiments, interface 700 enables a user to provide comments or a review of the recipe. In particular, a user can input any comments via text field or interface element 702. The comments can be viewed by users of the electronic marketplace in order to assess a particular recipe.

It should be appreciated that while the interfaces shown in FIGS. 3-7 show use of specific interface elements (e.g., text fields, etc.), any suitable interface elements or combination of interface elements can be used (e.g., a list, check boxes, radio buttons, etc.).

In some embodiments, a user can provide input or information regarding substitutions or alternative ingredients for a recipe. For example, a recipe may require an apple as an ingredient. A user may indicate, through a suitable interface, that substituting the apple in the recipe for a pear would make the food dish produced from the recipe taste better. Embodiments can use such information in the future to suggest substitutions or alternatives for the recipe to, for example, other users.

In some embodiments, rather than selecting and browsing for recipes, a user can have recipes automatically selected based on his or her user preferences and/or other data (e.g., purchase history, etc.). Based on the selected recipes, items can be selected and placed in a virtual shopping cart, or automatically purchased and delivered to the user. Illustratively, a user can indicate that he or she wishes to adhere to a certain diet plan. Embodiments, can select one or more recipes that meet, either alone or collectively, the requirements of the diet. For example, a user might indicate that he or she is currently on a low carbohydrates diet plan. Embodiments can select recipes that collectively provide a nutritional value that meets the requirements for the diet plan (e.g., selecting recipes that limit carbohydrate intake to a certain level).

In certain embodiments, a user can subscribe to an automatic recipe selection and delivery service that is based on his or her user preferences (e.g., price range, diet plans, food allergies, etc.) and/or other data. For example, a user subscribing to the service can indicate that he or she has a budget of $100 every week. Based on this information, embodiments can automatically select recipes that collectively cost $100 each week to produce. Based on these recipes, food and other items can be automatically purchased and/or delivered to the user on a periodic basis. For example, the user can receive a first delivery of items on Thursday and a second delivery of items on Friday. The service may continue to automatically select recipes and deliver items needed for those recipes until the user indicates that he or she no longer wants to be subscribed to the service.

In some embodiments, a user can provide information regarding food items the user currently owns or is available to the user. Recipes can thereafter be presented to the user based on the food items that the user previously input. In some embodiments, each of the recipes can include, as an ingredient, at least one of the food items. After being presented with the recipes, the user can select one or more of the recipes. In response to the selection, embodiments can identify those items available from the marketplace that are needed, in addition to the food items provided by the user, to complete a set of ingredients needed to prepare the recipes. Embodiments can thereafter either place the additional items in a virtual shopping cart associated with the user or automatically initiate a purchase transaction to purchase the additional items on behalf of the user.

Embodiments can, in some implementations, enable a user to input the food items that he or she currently owns or has available by using a portable device, such as a mobile phone, tablet device, multimedia player, hand-held scanner, camera, etc. For example, a user can use an RFID reader module of a mobile device to scan an RFID tag embedded in or attached to the package of a particular food item. The information obtained by the reader module can be received and processed by embodiments in order to determine a food item that the user currently has in his or her possession. As another example, a user can use a camera module of a mobile phone to take pictures of food items that the user currently has in his or her possession. The pictures can thereafter be received and processed by embodiments in order to determine the food items that the user currently has in his or her possession. For example, the images can be analyzed by Amazon Mechanical Turk™ or any suitable algorithmic systems.

In one embodiment, the user can use the camera to take pictures of barcodes on the packages or labeling of certain food items. The barcodes (either an image of the barcode or information related to the barcode e.g., a barcode value) can be matched against a bar code database stored on, for example, data store 110 to determine the food items in the user's possession.

In a second embodiment, the user can use the camera to take a suitable picture of one or more food items. The picture can be analyzed using a suitable algorithm to determine the food items that are the subjects of the picture, and therefore in the user's possession. For example, a user can take a picture of a particular food item. An algorithm can determine, based on the image characteristics of the picture that the picture includes a banana. As another example, a user can take a picture of his or her refrigerator. An algorithm can identify, based on the image characteristics of the picture, each of the individual foods in the user's refrigerator. Illustratively, the algorithm can determine that a cartoon of milk and a stalk of celery are in the user's refrigerator.

In a third embodiment, the algorithm use optical character recognition (OCR) to process the labels (e.g. packaging labels, sticker labels, etc.) of the food items in a picture. Through processing the text of the labels, the algorithm can identify the specific food items in a picture.

In some implementations, an algorithm can automatically fragment a picture into multiple portions and process each portion individually to determine the food items identified in the picture. In other implementations, a user can individually identify or tag regions (e.g., each region can include an individual food item) of the picture in order to enable the algorithm to fragment the picture for processing.

Although certain embodiments described above are described with respect to physical items, the methods and systems can be equally applied to items that are electronically fulfilled. For example, a user may be presented with the environmental impact information associated with the delivery of a physical medium containing a movie (e.g., a DVD, Blu-Ray disc, etc.) versus the environmental impact of the delivery of a movie downloaded or streamed to a user's selected client device over a network, such as the Internet.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dumb terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
   receiving, by a computer system, a request for recipes from a user device;
   receiving, over a network, a picture of one or more food items that are not needed for an order associated with the request for recipes, the picture captured by a camera module associated with the user device, the user device in communication with the computer system via the network;
   fragmenting, by the computer system, the picture into plurality of portions and processing each portion of the plurality of portions to identify the one or more food items included in the picture;
   providing, over the network, a listing of recipes for presentation to the user device, wherein a recipe included in the listing of recipes references, as an ingredient, at least one of the one or more food items identified in the picture;
   receiving, from the user device, a selection of at least one recipe from the listing;
   identifying, by the computer system, a set of catalog items, wherein each catalog item in the set of catalog items is needed to complete the at least one recipe;
   automatically adding, by the computer system, the set of catalog items to a virtual shopping cart associated with a user that does not include the one or more food items identified in the picture, wherein at least one catalog item in the set of catalog items is a non-food item;
   providing, over the network, the virtual shopping cart to the user device, wherein the virtual shopping cart includes purchase information for each catalog item in the virtual shopping cart; and
   creating, by the computer system, the order for the set of catalog items, the set of catalog items being based at least in part on a first catalog item that the user has previously purchased.

2. The computer-implemented method of claim 1, wherein the non-food item is a kitchen appliance, a utensil, an item of cutlery, an item of cookware, an item of bakeware, or an item of tableware.

3. The computer-implemented method of claim 1, further comprising substituting a catalog item in the set of catalog items with one or more alternative catalog items, wherein the substituting is based in part on at least one of the following: food allergy criteria, serving number criteria, a calorie requirement, a diet plan, an exercise plan, a religious requirement, a meal preparation skill level, a set of preferred food genres, price criteria, a percentage of food items to be used, an amount of food items to be used, or a set of food exclusions.

4. A computer-implemented method comprising:
receiving, by a computer system, a request for recipes from a user device;
receiving, over a network, a picture of one or more food items that are not needed for an order associated with the request for recipes, the picture captured by a camera module associated with the user device, the user device in communication with the computer system via the network;
receiving, via the user device, information identifying regions of the picture, a particular region of the regions including an individual food item;
fragmenting, by the computer system, the picture into a plurality of portions and processing each portion of the plurality of portions to identify the one or more food items included in the picture based at least in part on the information identifying the regions of the picture;
providing for presentation, to the user device, one or more recipes, wherein each recipe of the one or more recipes references, as an ingredient, at least one of the one or more food items identified in the picture;
receiving, from the user device, a selection of at least one recipe;
identifying, by the computer system, a set of catalog items, wherein the set of catalog items are needed to complete the at least one recipe; and
automatically adding, by the computer system, the set of catalog items to a virtual shopping cart associated with a user that does not include the one or more food items identified in the picture, the set of catalog items being based at least in part on a first catalog item the user has previously reviewed, wherein at least one catalog item in the set of catalog items is a non-food item.

5. The computer-implemented method of claim 4, wherein the non-food item is a kitchen tool.

6. The computer-implemented method of claim 4, wherein the picture includes at least one of the following: an image of the at least one food item, an image of a barcode associated with the at least one food item, or an image of a label associated with the at least one food item.

7. The computer-implemented method of claim 4, further comprising substituting one or more catalog items in the set of catalog items with one or more alternative catalog items.

8. The computer implemented method of claim 7 wherein the substituting is based in part on at least one of the following: food allergy criteria, serving number criteria, a calorie requirement, a diet plan, an exercise plan, a religious requirement, a meal preparation skill level, a set of preferred food genres, price criteria, a percentage of food items to be used, an amount of food items to be used, or a set of food exclusions.

9. The computer-implemented method of claim 4, wherein identifying the set of catalog items is based at least in part on user purchase history data.

10. The computer-implemented method of claim 4, wherein identifying the set of catalog items is based at least in part on training data.

11. A computer-implemented method comprising:
receiving, by a computer system, a request for recipes from a user device;
receiving, over a network, a picture of one or more food items that are not needed for an order associated with the request for recipes, the picture captured by a camera module associated with the user device, the user device in communication with the computer system via the network;
fragmenting, by the computer system, the picture into multiple portions and processing each portion of the multiple portions to identify the one or more food items included in the picture;
providing, over the network and via the user device, one or more recipes, wherein each recipe of the one or more recipes references, as an ingredient, at least one of the one or more food items identified in the picture;
receiving, from the user device, a selection of at least one recipe;
identifying, by the computer system, a set of catalog items, wherein the set of catalog items are needed to complete the at least one recipe; and
creating, by the computer system, an order for the set of catalog items that does not include the one or more food items identified in the picture, the set of catalog items being based at least in part on a first catalog item a user has previously returned, wherein at least one catalog item in the set of catalog items is a non-food item.

12. The computer-implemented method of claim 11, wherein the non-food item is cooking equipment.

13. The computer-implemented method of claim 11, wherein creation of the order results in the shipment of the set of catalog items to the user.

14. The computer-implemented method of claim 11, wherein the picture includes at least one of the following: an image of the at least one food item, an image of a barcode associated with the at least one food item, or an image of a label associated with the at least one food item.

15. The computer-implemented method of claim 11, wherein the processing includes performing optical character recognition on the picture.

16. The computer-implemented method of claim 11, further comprising substituting a first catalog item included in the set of catalog items with a second catalog item, wherein the substituting is based in part on at least one of the following: food allergy criteria, serving number criteria, a calorie requirement, a diet plan, an exercise plan, a religious requirement, a meal preparation skill level, a set of preferred food genres, price criteria, a percentage of food items to be used, an amount of food items to be used, or a set of food exclusions.

17. A computer-implemented method comprising:
receiving at least one user preference criteria;
receiving, by a computer system, a request for recipes from a user device;
receiving, over a network, a picture of one or more food items that are not needed for an order associated with the request for recipes, the picture captured by a camera module associated with the user device, the user device in communication with the computer system via the network;
receiving, via the user device and over the network, information identifying regions of the picture, wherein a particular region of the regions includes an individual food item;
fragmenting, by the computer system, the picture into multiple portions and processing each portion of the multiple portions to identify the one or more food items included in the picture based at least in part on the information identifying the regions of the picture;

causing presentation to the user device and over the network, of one or more recipes based on the at least one user preference criteria, wherein each recipe of the one or more recipes references, as an ingredient, at least one of the one or more food items identified in the picture;

receiving, from the user device, a selection of at least two recipes;

identifying, by the computer system, a set of one or more catalog items, wherein the one or more catalog items are needed to complete the at least one recipe;

creating, by the computer system, an order for the set of catalog items that does not include the one or more food items identified in the picture; and identifying, by the computer system, a first delivery date for a first subset of the set of catalog items and a second delivery date for a second subset of the set of catalog items.

18. The computer-implemented method of claim 17, wherein the at least one user preference criteria includes at least one of the following: food allergy criteria, serving number criteria, a calorie requirement, a diet plan, an exercise plan, a religious requirement, a meal preparation skill level, a set of preferred food genres, price criteria, a percentage of food items to be used, an amount of food items to be used, or a set of food exclusions.

19. The computer-implemented method of claim 17, further comprising initiating a periodic purchase transaction for the set of catalog items.

* * * * *